United States Patent

[11] 3,592,964

[72] Inventor Robert K. Waring, Jr.
Wilmington, Del.
[21] Appl. No. 777,546
[22] Filed Nov. 8, 1968
[45] Patented July 13, 1971
[73] Assignee E. I. du Pont de Nemours and Company
Wilmington, Del.
Continuation-in-part of application Ser. No. 688,608, Dec. 6, 1967, now abandoned.

[54] CONVERTING IMAGES RECORDED ON A MOVING MAGNETIC MEDIUM TO STATIONARY IMAGES
27 Claims, 10 Drawing Figs.

[52] U.S. Cl. .......... 178/6.6 A, 340/174.1 M, 350/151
[51] Int. Cl. .......... H04n 3/10, G11b 11/10, G02f 1/18
[50] Field of Search .......... 178/6.6 A; 179/100.2 E, 100.2 CH; 340/174.1, 174.1 M; 350/151; 346/74 MT

[56] References Cited
UNITED STATES PATENTS
3,229,273 1/1966 Baaba et al. .......... 179/100.2

*Primary Examiner*—Bernard Konick
*Assistant Examiner*—Steven B. Pokotilow
*Attorney*—Woodcock, Washburn, Kurtz & Mackiewicz

ABSTRACT: Transfer of a primary magnetic image from a moving recording medium to a stationary magnetic receptor surface is accomplished by applying a magnetic field to the receptor surface when the primary image is in the desired position relative to the receptor surface. The applied magnetic field is a decaying oscillating field or a pulsed unidirectional field, applied either parallel to the easy axis of magnetization of the receptor surface. Either periodic transfer of a sequence of images for video applications or aperiodic or single frame transfer required for microfilm readers is obtained. The applied magnetic field exceeds the coercivity of the receptor surface but not that of the moving record and is of such duration that the medium moves less than a resolution distance during transfer of the image.

CONVERTING IMAGES RECORDED ON A MOVING MAGNETIC MEDIUM TO STATIONARY IMAGES

CROSS-REFERENCE TO RELATED APPLICATIONS

This application is a continuation-in-part of my copending application Ser. No. 688,608, filed Dec. 6, 1967 now abandoned.

BACKGROUND OF THE INVENTION

Visual or optical images have been recorded in magnetic form on a magnetic medium. U.S. Pat. Nos. 2,915,594 to Burns et al. and 2,793,135 to Sims Jr., et al., show the recording of patterns on a magnetic medium.

One type of apparatus for reading these images out of the magnetic tape makes use of a magneto-optic effect. Such a readout apparatus is shown in U.S. Pat. No. 3,229,273 to Baaba et al. The Baaba et al. patent shows a magnetic transfer surface positioned adjacent the magnetic tape. The magnetic fields due to local surface magnetization of primary images recorded on the tape magnetize the corresponding areas of the transfer surface to produce a secondary magnetic image in this surface. The secondary image is converted to an optical image by applying plane polarized light to the surface. The plane of polarization of the incident light is rotated upon reflection from the magnetized surface. The sense of rotation is dependent upon the direction of magnetization of the surface.

In the Baaba et al. patent, the longitudinal magnetic Kerr effect is utilized for magneto-optic readout. Other Kerr effects and the Faraday effect may be utilized in the readout system. Magneto-optic effects such as these are described in "Magnetic Domains and Techniques for Their Observation, " R. Carey and E. D. Isaac, Academic Press, New York, 1966, Chapter 5, pp. 62—80.

In reproducing images recorded on a moving medium, means must be provided for framing each image. For example, in reproducing motion pictures, framing is accomplished by stopping the film periodically so that the film is stationary while each image is reproduced, and obscured while the next image is moved into place.

Another example of framing is shown in FIG. 5 of the Baaba et al. patent wherein a mechanically operated pressure plate is pushed down onto the moving tape. The moving pressure plate momentarily forces the moving tape against a transfer surface. In this way, the transfer surface is in contact with the tape during only a brief instant when the tape is effectively motionless, and it is out of contact with the tape while a new image moves into a position to be read out.

SUMMARY OF THE INVENTION

This invention relates to the reproduction of images which have been recorded in magnetic form on a magnetic medium. More particularly, the invention relates to means for reproducing a plurality of primary images, each of which has been recorded on a magnetic tape. For example, a sequence of images forming a motion picture may be recorded magnetically on a magnetic tape. These images are sequentially reproduced for display.

Each image must be reproduced during a short time period in which the moving recording medium moves less than a resolution distance of the image. This problem has come to be known as "framing."

However, it is advantageous to move the recording medium continuously while the images recorded thereon are displayed, rather than to stop the tape mechanically for display of each image, because the mechanical transport mechanism is simpler and because there is less mechanical stress on the recording medium.

In accordance with the present invention, framing is accomplished by applying a burst of magnetic field to a receptor surface. The receptor surface is positioned adjacent the moving magnetic tape so that the local surface magnetic field of each primary image is applied to the receptor surface. The amplitude of the local surface field of the primary image is insufficient to directly affect the receptor surface in the absence of the burst of magnetic field. Each of the bursts of the applied magnetic field effects a transfer of the primary image from the magnetic tape to the receptor surface, thereby producing a secondary image in the receptor surface. This secondary image is converted to a visual or optical display by magneto-optic effect, for example, by the Kerr effect.

Each secondary image is stored in the receptor surface until it is replaced by a succeeding one. The magnetic field burst can be of a very short duration, so that a stationary image is essentially always present in the receptor surface.

This effectively uninterrupted image can be detected by, for example, a scanning device such as a vidicon in such a way that the raster scan repetition rate of the detector need not be synchronous with the frame rate. Furthermore, the constancy of the image on the receptor member prevents the optical flicker phenomenon present in other methods of displaying motion pictures. The framing rates need only be high enough to render motion smoothly.

Accordingly, it is an important object of the present invention to provide reproducing apparatus for displaying images magnetically recorded on a continuously moving magnetic medium.

It is another object of the present invention to avoid mechanical framing techniques, such as intermittently stopping the movement of the magnetic tape with resultant stress on and possible breakage of the magnetic tape.

It is another object of the present invention to provide framing which can be accomplished with a relatively inexpensive tape transport not requiring complicated mechanical drives.

It is another object of the present invention to provide framing by applying a burst of magnetic field to a receptor surface when each recorded primary image is in the desired position relative to the receptor surface.

It is another object of the present invention to provide a reproducing system for detection of magnetically recorded images by a vidicon or similar type image detector in which the system does not necessarily have exact synchronism between the magnetic tape speed, or framing rate, and the field repetition rate of the image detector.

It is another object of the present invention to provide a reproducing system for detection of magnetically recorded motion pictures in which optical flicker phenomena are absent.

DESCRIPTION OF A PARTICULAR EMBODIMENT OF THE INVENTION

Figure 1:
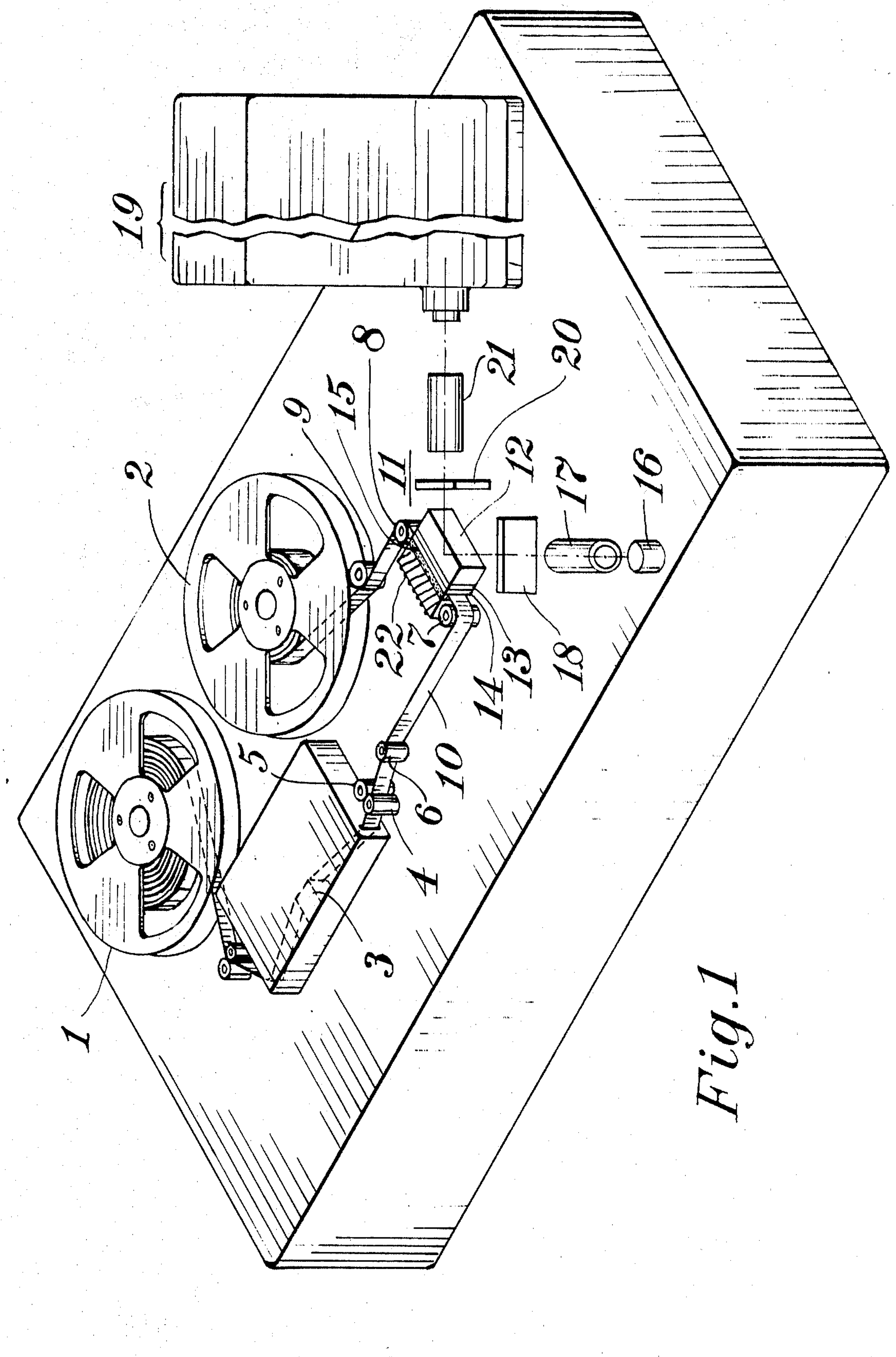
FIG. 1 shows a particular embodiment of the invention.
Figure 2:
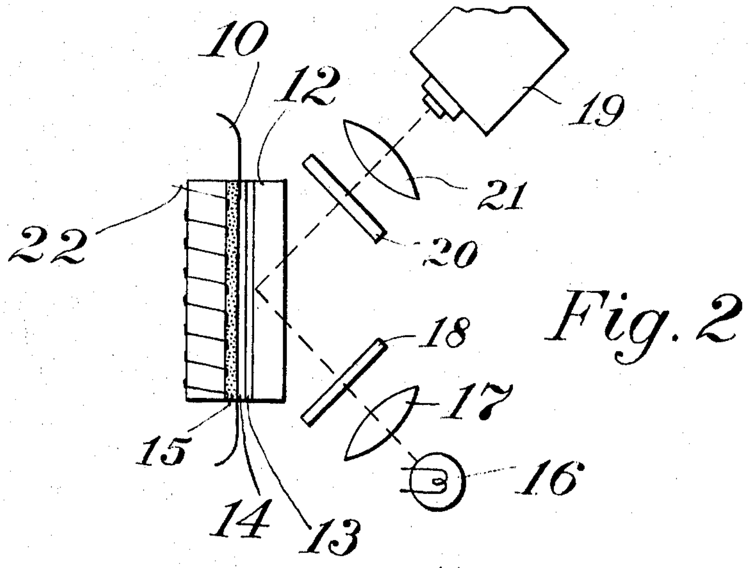
FIG. 2 shows a simplified ray diagram of the optics of FIG. 1.
Figure 3:
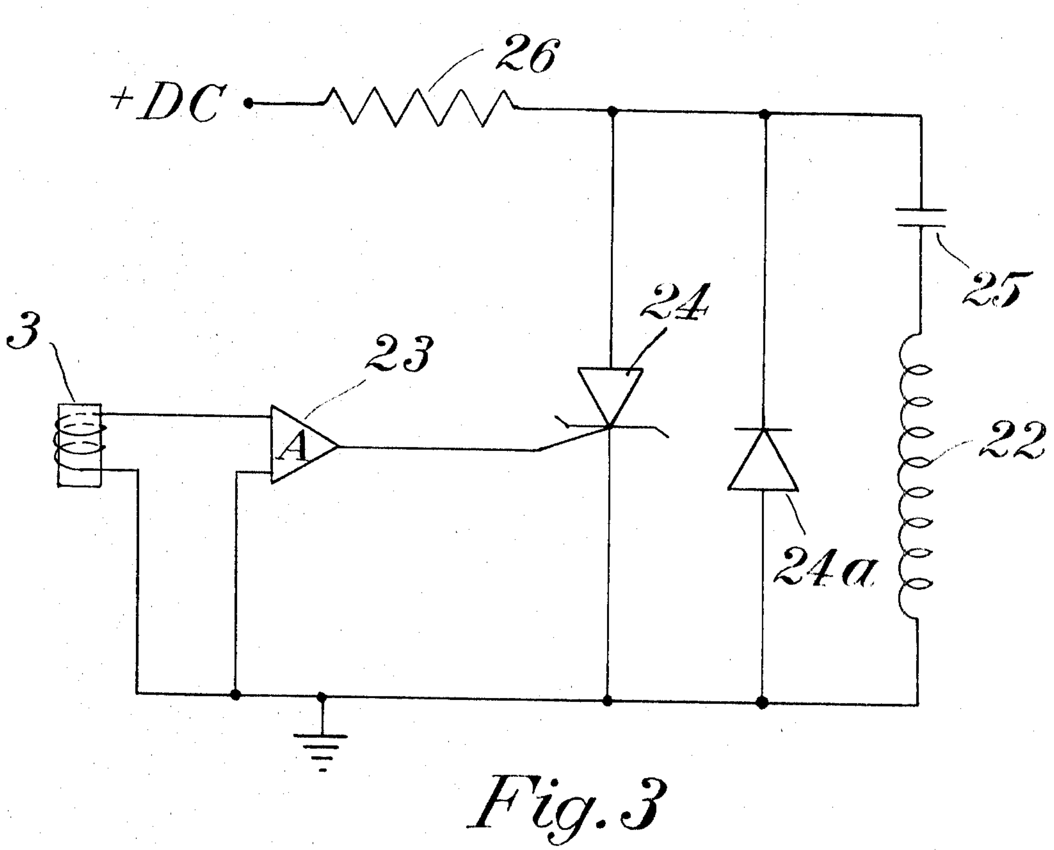
FIG. 3 shows a circuit diagram of the electrical connections of FIG. 1.

In conjunction with the following description, reference is made to FIG. 1, showing the mechanical layout of a particular embodiment; FIG. 2, showing a simplified ray diagram of the optical system; and FIG. 3, showing a circuit diagram of the electrical connections. Like reference numerals have been used to denote the same elements in these Figures.

Referring to FIG. 1, there is shown a conventional tape transport for moving a magnetic tape from a supply reel 1 to a takeup reel 2. The tape transport includes playback head 3 which is used to detect triggering signals, as will be subsequently explained.

The tape transport also includes a drive capstan 4, a pinch-wheel 5, and a guide pin 6. Guide pins 7, 8 and 9 have been added to guide the moving magnetic tape 10 past the receptor surface, or member, 11. In an actual embodiment of the invention, an Ampex F-4460 tape transport was used.

The receptor surface 11 includes a thin ferromagnetic film 13 laid down on a rigid transparent substrate 12. Typically, the ferromagnetic thin film 13 may be a nickel-iron alloy in the Permalloy® class. A thin protective surface 14 may be coated over the ferromagnetic film to prevent movement of the tape from wearing the thin film.

The receptor surface 11 is positioned in direct contact with the tape so that the local surface magnetic field of each primary image on the tape is applied to the receptor surface 11. In order to do this, a pressure pad 15 holds the tape in intimate contact with the receptor surface 11.

In order to display each secondary image, plane polarized light is incident upon the receptor surface 11 in an area substantially equal to the area of each primary image. A relatively small size, powerful source of light 16 emits a beam of light. The size of the source must be small, as close to a point source as possible, so that the collimator lens 17 will produce an optimally parallel beam which is applied to the polarizer 18. The plane polarized light from polarizer 18 is incident upon the receptor surface 11. The angle of incidence shown in the drawings is not necessarily the correct angle, but this angle can be adjusted by a person of ordinary skill in accordance with the material of the substrate 12 and the reflecting characteristic of the ferromagnetic film 13. Examples of components which are suitable for use to produce the plane polarized light beam are:

light source 16—G.E. type CM 1630
collimater lens 17, 18 mm. diameter, focal length 30 mm.
polarizer 18—Polaroid HN22 film The receptor surface 11 is illuminated with collimated plane polarized light. This light is reflected to form a visible image of the receptor surface which is projected onto an image detector 19.

The reflected light is modulated by the magneto-optic effect of the receptor surface on the incident light. In the particular example described, the longitudinal Kerr magneto-optic effect has been utilized. In making use of the longitudinal Kerr effect the plane of incidence of the illuminating light always contains the easy axis of magnetization of the receptor surface.

The visible image is formed by light which has passed through the analyzer 20 and image forming lens 21. The image forming lens 21 should be adjusted so that the image of the receptor surface is applied to the active element of the image detector 19. Image detector 19 may be an image orthicon tube, vidicon tube, or apparatus for forming a photographic image of the visible image formed by the image forming lens 21. Alternatively, image forming lens 21 can be adjusted to form an image which can be viewed with the human eye.

While FIG. 2 indicates that incident light is reflected from the back surface of the thin film 13, of course, it will be understood that light actually penetrates into the thin film and the Kerr effect takes place within the thin magnetic film.

The polarizer 18 is oriented to produce polarized light which has a plane of polarization which is transverse to the plane of incidence. The angle of the plane of polarization of the reflected light is rotated, by the Kerr effect, with respect to the angle of the plane of polarization of the incident light. The direction of rotation will depend upon the polarity of magnetization. For example, if a region of the receptor surface is magnetized to positive saturation, the light reflected from that region will have its plane of polarization rotated a given amount in one direction with respect to the plane of polarization of the incident light. If the region is magnetized to negative saturation, then the light reflected from that region will be shifted by the given amount in the other direction with respect to the plane of polarization of incident light.

For optimum contrast in the image, the analyzer 20 is oriented so that light reflected from the region of the receptor surface which has been magnetically saturated in one direction displays maximum contrast with light that has been reflected from a region of said receptor surface which has been magnetically saturated in the other direction. The analyzer 20 may be, for example, a disc of Polaroid® HN22 film.

In order to intermittently apply a burst of magnetic field to the receptor surface 11, biasing means, including the framing coil 22, have been provided. While the coil 22 may take various forms, it is particularly advantageous to wind the coil 22 on a rectangular block of nonmagnetic, nonconducting material. This block is positioned on the side of the tape 10 which is opposite the receptor surface. In this embodiments, good magnetic coupling between the coil and the surface is obtained. Biasing means other than a coil may be provided for applying a burst of magnetic field to the receptor surface.

For example, in some situations, it may be possible to intermittently pass current through the receptor surface itself or through a conducting surface which is contiguous to the receptor surface 11. This current will set up a burst of magnetic field.

The coil 22 is intermittently energized in response to trigger signals impressed at appropriate positions on the magnetic tape. The trigger signals accurately identify the position of each magnetic primary image recorded on the tape. For example, when motion pictures are to be reproduced, the sprocket holes on the original may be employed to generate the magnetic trigger signals in the proper positions on the recording medium. The playback head 3 detects the trigger signals which occur when the primary image on the magnetic tape is in the desired position relative to the receptor surface 11. Generally, it is advantageous to place the playback head 3 as close to the framing coil 22 as possible.

The circuit for triggering the biasing means is shown in FIG. 3. The trigger signal from playback head 3 is amplified in amplifier 23, the output of which is applied to the gate electrode of the silicon-controlled rectifier, or SCR, 24. The silicon-controlled rectifier is connected in a resonant circuit which includes the capacitor 25 and the framing coil 22. A DC voltage is applied through resistor 26 to the resonant circuit. The trigger signal applied to the gate of SCR 24 causes the SCR 24 to conduct. The capacitor 25, previously charged to the voltage of the DC source, is now discharged through the SCR 24. On the opposite half cycle the discharge is through diode 24*a*. The discharge is oscillatory and the oscillations are of diminishing amplitude as energy is dissipated in the resistance of the circuit. As examples of circuit components which are suitable for use in the circuit of FIG. 3, the following may be used:

coil 22—120 turns of No. 26 copper wire wound on rectangular form of three-quarter inch square cross section
silicon-controlled rectifier 24—G.E. C20D
diode 24*a*—IN4005
capacitor 25—0.1 microfarads
resistor 26—51,000 ohms In this embodiment, the trigger signal produces a pulse at the output of amplifier 23 having a time duration of approximately $10^{14}$ second.

Figure 4A:
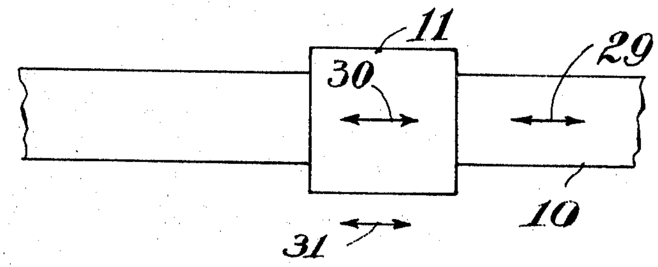
FIGS. 4*a*—4*d* show various modifications of the invention.
Figure 4B:
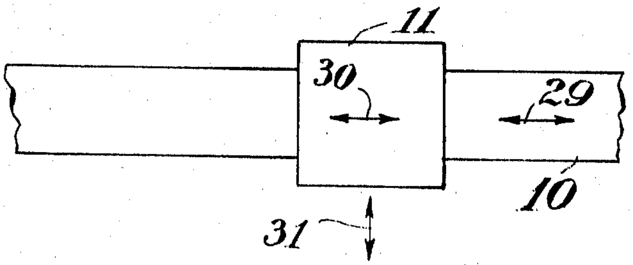
Figure 4C:
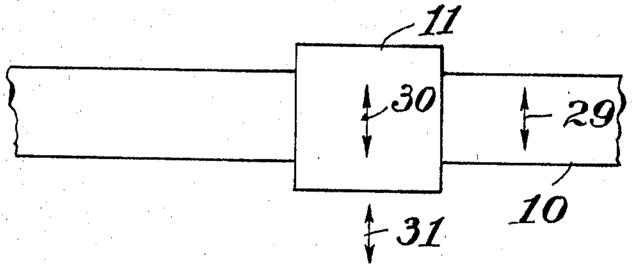
Figure 4D:
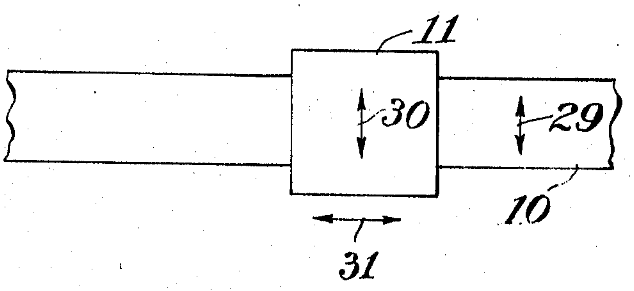
Figure 4:
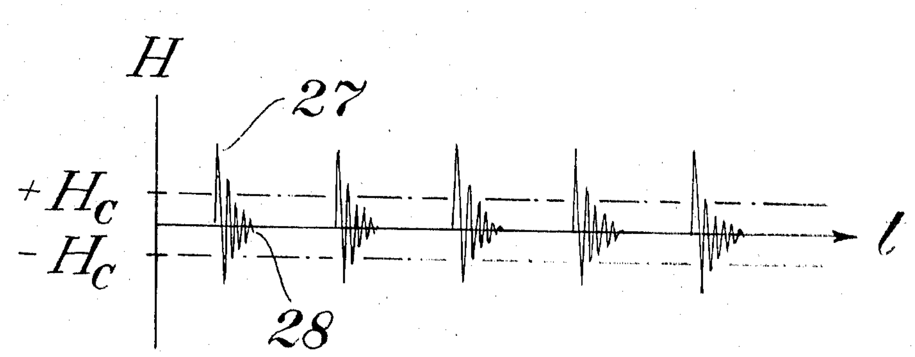
FIG. 4 shows the waveforms of the AC bursts of magnetic field.

FIG. 4 shows the bursts of oscillating magnetic field produced by the framing coil 22. Each burst includes oscillations which diminish from a maximum level at 27 to a minimum level at 28. The maximum level at 27 is sufficient to produce magnetic saturation of the receptor surface 11. As shown, the minimum level at 28 is zero. However, it will be understood that the minimum level need not be zero but may be a level which is substantially below the coercivity of the receptor surface 11. In FIG. 4 the levels $+H_c$ and $-H_c$ represent the coercivity of the receptor surface 11 in the direction of the applied burst of magnetic field. (In FIG. 4 the burst length has been distorted relative to the spacing for normal framing rate.)

In the specific embodiment described above, the duration of the magnetic field burst is approximately $50\times10^{16}$ seconds. A suitable range of burst length is from $10^{116\ 3}$ seconds (the flicker limit) to $10^{116\ 9}$ seconds (the maximum magnetic switching rate).

It should be noted that the bursts of magnetic field do not erase the original magnetic record, i.e., the maximum amplitude of each burst is less than the coercivity of the recording medium.

In accordance with normal magnetic tape recording techniques, the image is recorded by modulation of the magnetization in the plane of the tape. Information may be recorded with magnetization which is parallel to the long direction of the tape. Also, information may be recorded with magnetization which is transverse to the tape, such tape being commonly referred to as vertically oriented tape. In the embodiment described, it has been assumed that the primary image has been recorded with magnetization parallel to the long direction of the tape Referring to FIG. 4*a*, the magnetization of the tape 10 has been indicated by the arrow 29. The easy axis of magnetization of the receptor surface 11 will always be parallel to the magnetization of the tape. The easy axis of magnetization of the receptor surface 11 has been denoted by the arrow 30. In the specific embodiment just described, the magnetic field from the framing coil 22 is applied parallel to the easy axis of magnetization of the receptor surface 11. The direction of the applied field is indicated by the arrow 31.

OPERATION OF THE SPECIFIC EMBODIMENT SHOWN IN FIGS. 1, 2, 3 and 4*a*

In this embodiment of the invention, a process referred to as "anhysteretic magnetization" is used to fix an image from the tape on the receptor surface 11. Anhysteretic magnetization is a well-known phenomenon described, for example, in "The Physics of Magnetic Recording," C. D Mee, Interscience Publishers, New York, 1964, Chapter 2, pp. 24—26. Briefly, an oscillating field which diminishes from a maximum value to a minimum value is applied by the framing coil 22 to the receptor surface 11. A unidirectional field, which is the local surface field of a point of the image on the tape, is also applied to the receptor surface 11.

Figure 5:
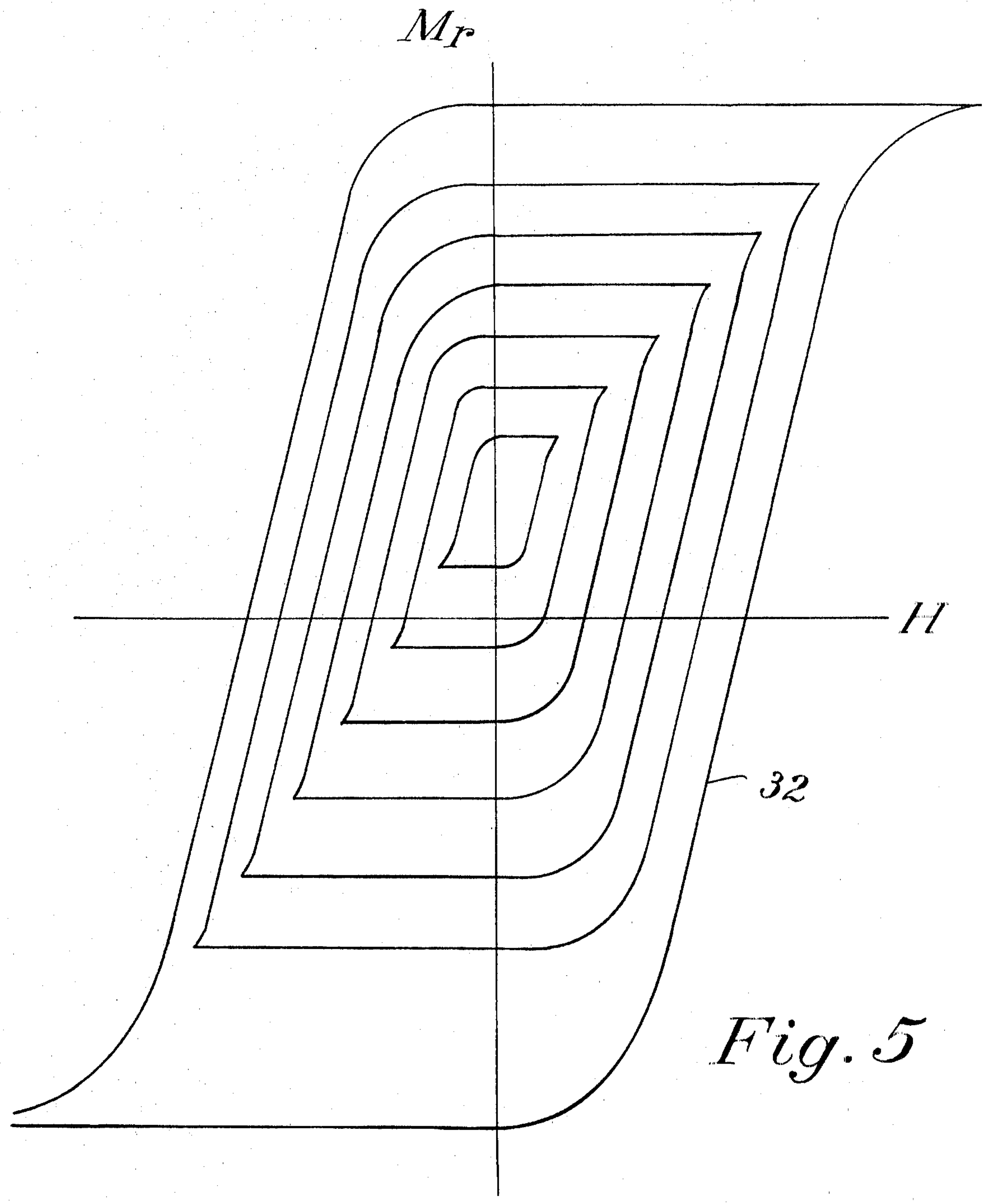
FIG. 5 shows the major and minor hysteresis loops of a magnetic material.

Referring to FIG. 5, an oscillating field applied to a magnetic medium will change the magnetization of the medium as shown by the hysteresis curve or loop 32. Initially, the maximum value of the oscillating field is sufficiently large to drive the magnetization of the material through the major hysteresis loop 32 shown in FIG. 5. Subsequently, the amplitude of the oscillating field is gradually reduced from its maximum level in the presence of a small DC field so that the magnetization is successively driven through diminishing asymmetric minor hysteresis loops. Several such minor hysteresis loops have been shown in FIG. 5. The oscillating magnetic field is gradually reduced to zero and the magnetization of the receptor surface 11 will assume a value which is related to the local surface unidirectional field which was applied from the tape according to the anhysteretic characteristic which is displayed in FIG. 6. In this way, the configuration of the local surface field from the tape has been transferred to the receptor surface 11 even though the local surface field at no time exceeded the coercivity of the receptor surface 11.

Figure 6:
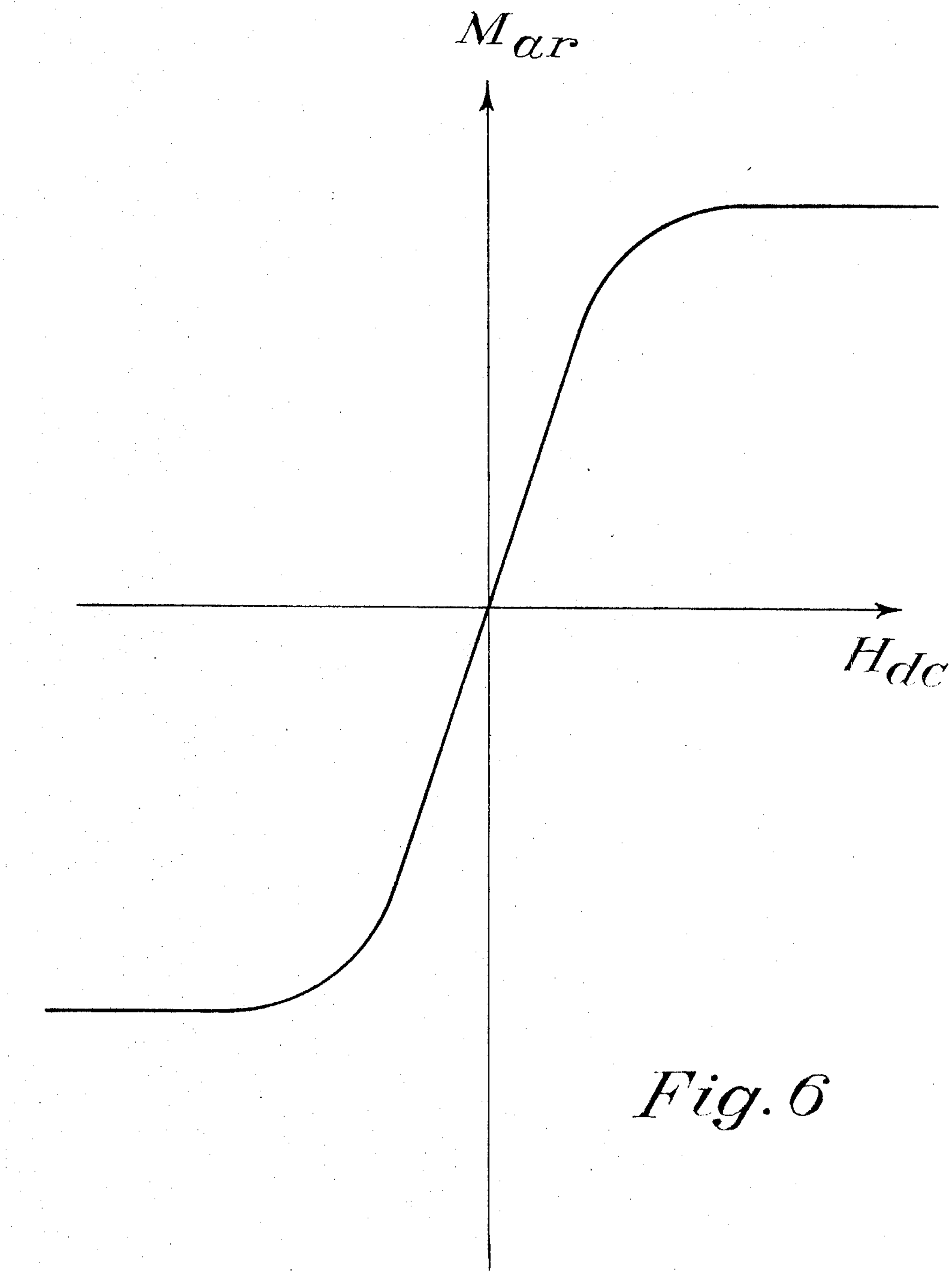
FIG. 6 shows the anhysteretic magnetization curve.

Simultaneous application of a constant unidirectional field and an oscillating field which is gradually reduced from a saturating value to zero results in an anhysteretic remanent magnetization characteristic which is shown in FIG. 6. FIG. 6 shows the resultant anhysteretic remanent magnetization $M_{ar}$ as a function of the applied unidirectional field $H_{dc}$, corresponding to the local surface field.

MODIFICATIONS OF THE INVENTION

Several other modifications are shown in FIGS. **4*b*—4*d*. In each of these figures, the arrow 29 denotes the direction of magnetization of the tape; the arrow 30 denotes the easy axis of magnetization of the receptor surface; and the arrow 31 denotes the direction of applied biasing field. For example, as depicted in FIG. 4*b*, the magnetic field may be applied in a direction which is transverse to the easy axis of magnetization of the receptor surface 11 as represented by the arrow 31. The easy axis of magnetization of the receptor surface, as indicated by the arrow 30, and the magnetization on the tape, as indicated by the arrow 29**, are the same as for the embodiment previously described.

In order to apply an oscillating magnetic field transverse to the easy axis of magnetization of the receptor surface 11, it is only necessary to rotate the position of the framing coil 22 by 90° about an axis which is perpendicular to the magneto-optic surface. In accordance with one aspect of the present invention, the applied transverse oscillating field is used to impress a secondary magnetic image on the receptor surface 11.

Alternatively, a single pulse of unidirectional field could be applied transverse to the easy axis of magnetization. Techniques are known for affecting the magnetization of a thin film by applying an oscillating or a unidirectional field transverse to the easy axis of magnetization. Such techniques are disclosed, for example, in T. S. Crowther, Journal of Applied Physics, Vol. 34, page 580, (1963).

In accordance with another aspect of the present invention, a secondary magnetic image is impressed upon the receptor surface 11 by applying a single unidirectional field pulse having an amplitude substantially greater than the anisotropy field of the receptor surface. The unidirectional field is applied perpendicular to the easy axis of magnetization of the receptor surface 11 and in the plane of the receptor surface.

The circuit of FIG. 3 can be simply modified to produce the desired DC pulse. These modifications are that the diode **24*a* is removed from the circuit and the triggering signal applied to the gate of the SCR 24 has a relatively short time duration with respect to the period of oscillation of the resonant circuit. The modifications of FIGS. 4*c* and 4*d* may be used when the image is recorded on the magnetic tape by modulation of the magnetization of the tape where the magnetization of the tape is transverse to the long axis of the tape. In this case, the receptor surface 11, together with the associated optical system, is rotated 90° about an axis perpendicular to its surface so that the easy axis of magnetization of the receptor surface 11, indicated by the arrow 30, a is again parallel to the magnetization on the tape and to the optical plane of incidence. In FIG. 4*c*, the applied magnetic field is parallel to the easy axis of magnetization of the receptor surface 11, as indicated by the arrow 31. In FIG. 4*d*, the applied magnetic field is transverse to the easy axis of magnetization, as indicated by the arrow 31**.

As another modification, the applied field parallel to the easy axis of magnetization of the receptor surface 11, as shown in FIGS. **4*a* and 4*c*, may be a unidirectional field. However, in this case, the unidirectional field must be less than the coercivity of the receptor surface. In this case, the unidirectional field is applied strictly as a bias which makes it possible for the local surface field from the tape to change the magnetization of the tape. That is, the sum of the local surface field and the applied unidirectional bias field are sufficient to change the magnetization of the receptor surface, but either of these fields applied individually would not change the magnetization. In this case, the unidirectional field is applied first in one direction which exceeds the coercivity of the receptor surface in order to erase the previous image and prepare the receptor surface for the new image, then the polarity of the applied unidirectional field is reversed to a level less than the coercivity of the receptor surface This field, in conjunction with the local surface field from the tape, changes the magnetization of the receptor surface if the local surface field is in the same direction as the applied unidirectional field. Modifications of FIG. 3** which will produce such a reversing polarity unidirectional field in synchronism with the triggering signals are as follows.

A resistor can be placed in series with coil 22 that will result in a rapid decay of the oscillating burst. The value of the resistor and the initial voltage on the capacitor 25 are selected so that the first half cycle of the burst, applied in the negative direction, erases the previous image. The second half cycle is of a decreased amplitude. The amplitude is just sufficient , when added to the positive surface field from the primary image, to reverse those regions contiguous to the positive surface fields. Succeeding half cycles are insufficient to have any effect.

Normally, when an image detector of the scanning type is used in a system of this type, it is necessary to maintain synchronism between magnetic tape speed, or the framing rate, and the field repetition rate of the image detector. However, when an image detector of the vidicon type, or other type having the desirable characteristics described hereafter, is used in the system of this invention, synchronism between the tape motion and the field repetition rate is not necessary. That is, the system can be asynchronous. For example, the tape speed may be such that the coil 22 is energized 24 times per second; readout from the tape is at 24 images per second. However, the field repetition rate of the image detector, or vidicon, 19 may be 60 per second. That is, the complete raster of the vidicon tube is scanned 60 times per second. (Actually, in present commercial television practice, the raster is scanned 30 times per second; there are two fields per frame).

This asynchronous readout is made possible by two features of the system of this invention. First, is the ability of a vidicon tube to integrate light flux incident upon the face of the tube. That is, the voltage output of the tube when the electron beam is reading any particular element of the active surface will be proportional to the total amount of light that has struck that element since the previous time it was read. A vidicon and certain other image detectors have this characteristic. Also, a very important feature of the system of this invention makes asynchronous operation possible. This feature is that the secondary image in the receptor surface 11 will remain fixed therein between framing pulses. Asynchronous readout of this type would not be possible in systems in which the secondary image was fixed in the receptor surface for only brief increments of time.

Note that it is possible not only to have different framing and field repetition rates, it is also possible for them to be completely asynchronous. That is, in the example above, even though the framing rate varies slightly from 24 frames per second, the system will still operate. This greatly relaxes the requirements on the tape transport as to constant movement.

The storage of the secondary image in the receptor surface between framing pulses also eliminates the phenomena that necessarily occurs in other motion picture display techniques where the image must be obscured for an appreciable fraction of the framing period while a new frame is moved into place. In the present invention, the change from one frame to the next can occur in less that 50 microseconds so that there is no sensible interruption of light. In motion picture and television practice framing rates are dictated by the necessity for keeping the flicker frequency higher than the human eye can detect, whereas motion can be rendered smoothly at much lower framing rates by the present invention. In order to render motion smoothly, the recording medium and the biasing means are deactivated so as to yield a framing rate less than 24 frames per second but greater than eight frames per second. The different requirements for flicker-free display and for smooth rendition of motion have been studied by K. Teer, Philips Research Reports, 14, 501 (1959).

While particular modifications have been described, it will be understood that various other modifications may be made within the spirit and scope of the invention.

What I claim is:

1. Apparatus for converting primary images recorded on a magnetic recording medium to fixed secondary images comprising:

a receptor surface having magnetic properties including a coercivity lower than that of said recording medium and greater than the maximum magnetic field of said primary images, said receptor surface being positioned adjacent said recording medium so that the local surface magnetic field of each primary image is applied to said receptor surface, means for moving said recording medium relative to said receptor surface, biasing means for intermittently applying bursts of magnetic field to said receptor surface to transfer said primary image to said receptor surface, and triggering means for triggering said biasing means to produce said bursts when said primary images are in the desired position relative to said receptor surface.

2. The apparatus recited in claim 1 wherein said recording medium is between said biasing means and said receptor surface so that said bursts of magnetic field are applied to said recording medium as well as to said receptor surface.

3. Magneto-optic apparatus for converting primary images recorded on a moving magnetic recording medium to secondary images each of which may be converted to an image, comprising:

a receptor surface having magnetic properties including a coercivity lower than that of said recording medium, said receptor surface being positioned adjacent said recording medium so that the local surface magnetic field of each primary image is applied to said receptor surface, means for moving said recording medium relative to said receptor surface, a source of light which is incident on said receptor surface, means for detecting images formed by light reflected from said receptor surface and modulated by the magneto-optic effect of said receptor surface on said light, biasing means for intermittently applying bursts of magnetic field to said receptor surface to transfer said primary image to said receptor surface, and triggering means for triggering said biasing means to produce said bursts when said primary images are in the desired position relative to said receptor surface.

4. The apparatus recited in claim 3 wherein triggering signals are recorded on said magnetic medium to identify the location of each primary image on said magnetic medium, further including:

a magnetic reproducing head positioned adjacent said magnetic medium to detect said triggering signals, said triggering means being responsive to said triggering signals for triggering said biasing means.

5. The apparatus recited in claim 3 wherein said magnetic recording medium is a magnetic tape which is moved across said receptor surface and wherein said biasing means includes:

an electrical coil wound upon a form of nonmagnetic material, said form having a plane surface which is positioned to urge the coating of said tape into intimate magnetic coupling with said receptor surface.

6. The apparatus recited in claim 3 wherein said magnetic recording medium is a magnetic tape which is moved across said receptor surface and wherein said biasing means includes:

an electrical coil positioned to apply a magnetic field to said receptor surface.

7. The apparatus recited in claim 3 wherein said local surface magnetic field of each primary image has an amplitude below the level which will affect the magnetization of said receptor surface in the absence of an assisting field.

8. The apparatus recited in claim 3 wherein said means for detecting images includes:

an image detector of the type having means for scanning said images formed by said light reflected from said receptor surface, and wherein the repetition rate of said scanning is asynchronous with the production of said bursts of magnetic field.

9. The apparatus recited in claim 3 wherein said biasing means is so disposed and has a size such that all portions of said primary image are simultaneously transferred to said receptor surface to form a secondary image in congruence with the local surface magnetic field in corresponding areas of said primary image.

10. The apparatus recited in claim 3 wherein said biasing means for intermittently applying bursts of magnetic field produces a burst of magnetic field having a time duration less than 1 millisecond so that flicker is not detectable by visual observation.

11. The apparatus recited in claim 3 wherein said means for moving the recording medium and said biasing means are activated so as to yield a framing rate less than 24 frames per second but greater than eight frames to render motion smoothly.

12. The apparatus recited in claim 3 wherein each primary image is recorded on said magnetic medium by modulation of the magnetization of said medium, which magnetization is in a direction parallel to the direction of movement of said medium relative to said receptor surface and wherein said receptor surface is positioned such that its axis of easy magnetization is parallel to said movement.

13. The apparatus recited in claim 12 wherein said biasing means includes:

a coil positioned to apply said bursts of magnetic field to said receptor surface in a direction which is parallel to said movement, and means connected to said coil for producing said bursts so that each is an oscillating magnetic field which has a field strength which is gradually reduced from a maximum level substantially producing magnetic saturation of said receptor surface to a minimum level which is below the coercivity of the receptor surface to produce anhysteretic remanent magnetization of said receptor surface which is a function of the local surface magnetic field of each primary image.

14. The apparatus recited in claim 12 wherein said biasing means further includes:

a coil positioned to apply said bursts of magnetic field to said receptor surface in a direction which is parallel to said movement, and means connected to said coil for producing said bursts so that each burst is a unidirectional field having an initial polarity and an initial amplitude greater than the coercivity of said receptor surface to erase the previously transferred secondary image, said unidirectional field being switched to the opposite polarity with an amplitude less than the coercivity of said receptor surface to produce remanent magnetization of said receptor surface which is a function of the local surface magnetic field of each primary image.

15. The apparatus recited in claim 12 wherein said biasing means includes:

a coil positioned to apply said bursts of magnetic field to said receptor surface in a direction which is transverse to said movement, and means connected to said coil for producing said bursts so that each is an oscillating magnetic field which has a field strength which is gradually reduced from a maximum level substantially producing transverse magnetic saturation of said receptor surface to a minimum level which is substantially below the anisotropy field of the receptor surface to produce remanent magnetization of said receptor surface which is a function of the local surface which is a function of the local surface magnetic field of each primary image.

16. The apparatus recited in claim 12 wherein said biasing means further includes:

a coil positioned to apply said bursts of magnetic field to said receptor surface in a direction transverse to said movement, and means connected to said coil for producing said bursts so that each burst is in a unidirectional field having a peak amplitude substantially greater than the anisotropy field of said receptor surface to produce remanent magnetization of said receptor surface which is a function of the local surface magnetic field of each primary image.

17. The apparatus recited in claim 3 wherein each primary image is recorded on said magnetic medium by modulation of the magnetization of said medium in the plane of said medium but where magnetization of said medium is transverse to the direction of movement of said medium relative to said receptor surface and wherein said receptor surface is positioned such that its axis of easy magnetization is transverse to said direction of movement.

18. The apparatus recited in claim 17 wherein said biasing means further includes:

a coil positioned to apply said bursts of magnetic field to said receptor surface parallel to the easy direction of magnetization of said receptor surface, and means connected to said coil for producing said bursts so that each is an oscillating magnetic field which has a field strength which is gradually reduced from a maximum level substantially producing magnetic saturation of said receptor surface to a minimum level which is below the coercivity of the receptor surface to produce anhysteretic remanent magnetization of said receptor surface which is a function of the local surface magnetic field of each primary image.

19. The apparatus recited in claim 17 wherein said biasing means further includes:

a coil positioned to apply said bursts of magnetic field to said receptor surface parallel to the easy direction of magnetization of said receptor surface, and means connected to said coil for producing said bursts so that each burst is a unidirectional field having an initial polarity and an initial amplitude greater than the coercivity of said receptor surface to erase the previously transferred secondary image, said unidirectional field being switched to the opposite polarity with an amplitude less than the coercivity of said receptor surface to produce remanent magnetization of said receptor surface which is a function of the local surface magnetic field of each primary image.

20. The apparatus recited in claim 17 wherein said biasing means further includes:

a coil positioned to apply said bursts of magnetic field to said receptor surface parallel to said direction of movement, and means connected to said coil for producing said bursts so that each is an oscillating magnetic field which has a field strength which is gradually reduced from a maximum level substantially producing transverse magnetic saturation of said receptor surface to a minimum level which is substantially below the anisotropy field of the receptor surface to produce remanent magnetization of said receptor surface which is a function of the local surface magnetic field of each primary image.

21. The apparatus recited in claim 17 wherein said biasing means further includes:

a coil positioned to apply said bursts of magnetic field to said receptor surface in a direction parallel to said movement, and means connected to said coil for producing said bursts so that each burst is a unidirectional field having a peak amplitude substantially greater than the anisotropy field of said receptor surface to produce remanent magnetization of said receptor surface which is a function of the local surface magnetic field of each primary image.

22. The method of converting primary images recorded on a magnetic recording medium to secondary images, each of which may be converted to an image, in a receptor surface positioned adjacent said recording medium comprising:

moving said recording medium relative to said receptor surface so that the local surface magnetic field of each primary image is applied to said receptor surface, and intermittently applying bursts of magnetic field to a receptor surface having a coercivity greater than the maximum field of said primary images when said primary images are in the desired position relative to said receptor surface so that primary images on said recording medium are converted to secondary images in said receptor surface.

23. The method recited in claim 22 further including:

applying light to said receptor surface, detecting images formed by light reflected from said receptor surface and modulated by the magneto-optic effect of said receptor surface on said light.

24. The method recited in claim 22 further comprising:

applying said bursts of magnetic field to said recording medium and to said receptor surface.

25. The apparatus recited in claim 22 further comprising:

means for applying said bursts of magnetic field to said recording medium and to said receptor surface.

26. Apparatus for converting primary images recorded on a magnetic recording medium to secondary images, each of which may be converted to an image comprising:

a receptor surface having a coercivity greater than the maximum field of said primary images positioned adjacent said recording medium, means for moving said recording medium relative to said receptor surface so that the local surface magnetic field of each primary image is applied to said receptor surface, and means for intermittently applying bursts of magnetic field to said receptor surface when said primary images are in the desired position relative to said receptor surface so that primary images on said recording medium are converted to secondary images in said receptor surface.

27. The apparatus recited in claim 26 further including:

means for applying light to said receptor surface, means for detecting images formed by light reflected from said receptor surface and modulated by the magneto-optic effect of said receptor surface on said light.